United States Patent [19]

Parsons

[11] Patent Number: 4,520,516

[45] Date of Patent: Jun. 4, 1985

[54] ULTRASONIC FLOW-CONTROL SYSTEM

[76] Inventor: Natan E. Parsons, 86 Henry St., Cambridge, Mass. 02139

[21] Appl. No.: 535,213

[22] Filed: Sep. 23, 1983

[51] Int. Cl.³ .............................................. E03C 1/05
[52] U.S. Cl. ...................................... 4/623; 251/129; 367/93
[58] Field of Search ...................... 4/192, 623; 367/93; 340/565, 693; 251/129

[56] References Cited

U.S. PATENT DOCUMENTS

| | | |
|---|---|---|
| 2,438,207 | 3/1948 | Derby . |
| 2,507,966 | 5/1950 | Filliung . |
| 2,603,794 | 7/1952 | Bokser . |
| 3,151,340 | 10/1964 | Teshima . |
| 3,314,081 | 4/1967 | Atkins et al. . |
| 3,406,941 | 10/1968 | Ichimori et al. . |
| 3,575,640 | 4/1971 | Ishikawa . |
| 3,638,680 | 2/1972 | Kopp .................................. 137/606 |
| 3,670,167 | 6/1972 | Forbes . |
| 3,724,001 | 4/1973 | Ichimori et al. . |
| 4,141,091 | 2/1979 | Pulvari . |
| 4,229,811 | 10/1980 | Salem ................................. 367/93 |
| 4,309,781 | 1/1982 | Lissau . |
| 4,402,095 | 9/1983 | Pepper .................................. 4/623 |

Primary Examiner—Charles E. Phillips
Attorney, Agent, or Firm—Cesari and McKenna

[57] ABSTRACT

A control circuit (16) mounted on a faucet (10) operates an ultrasonic transducer (20) that transmits ultrasound into a target region (22) below the outlet (24) of the faucet. The control circuit receives electrical signals from the transducer when the transducer receives echoes from objects within the target region. The control circuit times the echoes to determine the distance of the object causing the echoes, and, if the distance of the object changes between successive measurements, the control circuit operates a valve (12) to permit water to flow. The circuit is powered by a rechargeable battery (18) that is charged by the action of a generator (31) that is driven by a turbine (34) powered by the flow of water through the faucet.

13 Claims, 5 Drawing Figures

4,520,516

ULTRASONIC FLOW-CONTROL SYSTEM

BACKGROUND OF THE INVENTION

The present invention is directed to a system for controlling water flow ultrasonically.

Water has taken its place with other commodities as an object of conservation. Accordingly, numerous devices have been proposed to aid in the conservation effort. Among the most important devices for domestic use are those for restricting unnecessary water flow. For instance, shower heads that decrease the volume flow of water while increasing its velocity to maintain the effectiveness of the water flow can reduce water usage during showers to a fraction of previous levels.

Another cause of wasted water is the flow of water during periods when it is not actually being used. For instance, when dishes are being rinsed, it is not uncommon for the user to allow the water to run in a steady stream even though the rinsing only occurs intermittently. This is largely a result of the inconvenience of turning the water on and off at frequent intervals.

Accordingly, devices have been proposed that automatically sense the proximity of an object to a faucet and operate the faucet in response to the proximity. The intended result is for the water to flow only when an object is actually below the faucet. In addition to saving water, such devices eliminate the need to operate a valve manually. Such an arrangement can be beneficial to people whose hands are full, who are handicapped, or who, like surgeons, cannot touch nonsterile objects after washing.

The devices heretofore proposed have employed optical or electromagnetic sensing means, which, although possibly practicable, present certain design complexities and practical difficulties. In the case of the electromagnetic devices, there is a lack of directivity in the sensors, and this presents obvious difficulties in the dishwashing and rinsing situation. Optical devices, on the other hand, can be quite directive. But it is difficult to restrict their sensing ranges to prescribed distances.

Other problems arise in some types of sensing arrangements. For instance, when Doppler-type sensors are used with stainless-steel sinks, flow can be triggered unnecessarily when shocks and sound from positions remote from the area of interest propagate into the target region because of the propagation characteristics of the stainless-steel sink.

Also, adoption of proximity-sensing devices for domestic use is inhibited by the need to run wires to the faucet. Although the power for such devices would ordinarily be supplied at safe, low voltages, the association of danger in the mind of the user with the combination of water and electricity might make him reluctant to adopt such a device.

It is accordingly an object of the present invention to provide a means of object sensing that is less prone to the design and utilization difficulties that beset optical and electromagnetic devices.

An object of some of the aspects of the present invention is to avoid difficulties presented by Doppler-type devices.

An object of other aspects of the present invention is to avoid the psychological barrier caused by the use of visible electrical connections.

SUMMARY OF THE INVENTION

Various of the foregoing and related objects are achieved in an ultrasonic flow-control system in which an ultrasonic transducer transmits ultrasound into a target region beneath the outlet of a faucet and detects echoes from objects in the target region to provide an indication to a control circuit of the presence of the objects. The control circuit operates an electrically operable valve in the faucet to control the flow of water in accordance with whether or not objects are detected in the target region.

Certain of the objects are achieved in a device that first determines the distance of a detected object and then compares the detected distance with a previously detected distance to determine if any motion of the object is occurring. Motion is thus detected without the difficulties that accompany Doppler-shift devices. Flow is permitted only if motion of the object has been detected.

Other objects are achieved in a device of this type that includes a small turbine in the water flow and a generator mounted on the faucet to be driven by the turbine. An energy-storage device, such as a rechargeable battery, that can be recharged by the generator is employed to power the control circuitry so that it requires no external source of power. This eliminates the need for the electric wires that can present a psychological barrier to the adoption of such devices.

BRIEF DESCRIPTION OF THE DRAWINGS

These and further features and advantages of the present invention are described in connection with the accompanying drawings, in which.

DETAILED DESCRIPTION OF THE PREFERRED EMBODIMENT

Figure 1:
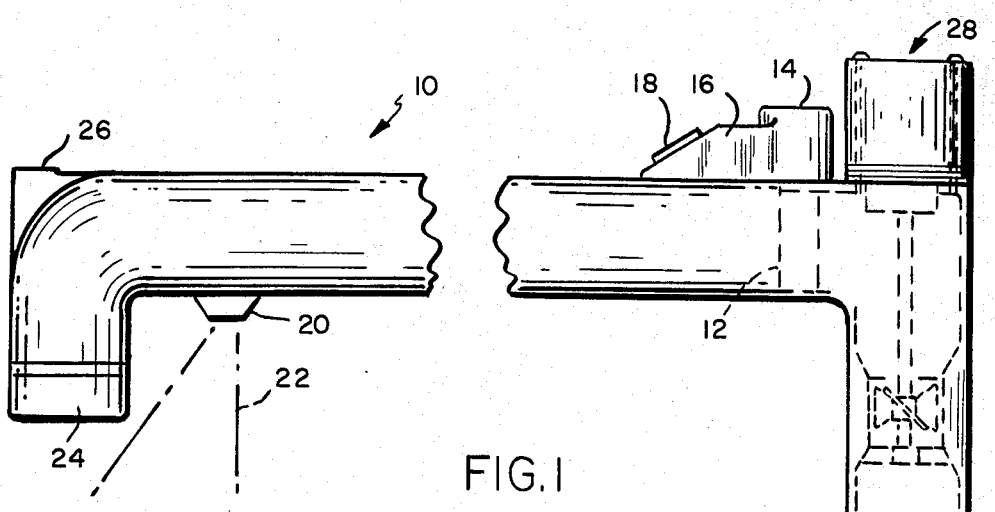
FIG. 1 is a side elevation of an embodiment of the present invention.

FIG. 1 depicts an ultrasonically-controlled faucet 10 having a valve 12 in its water stream that is controlled by a magnetic actuator 14. The actuator 14 is of the type that requires power only to change its state; no power is needed to keep the valve open or closed. The state of the valve 12 is controlled by a control circuit 16 powered by a rechargeable nickel-cadmium battery pack 18. The control circuitry 16 is also connected to an ultrasonic transducer 20 by means of wires concealed in the faucet. The ultrasonic transducer transmits sound into a region defined by dashed lines 22. The region into which the ultrasound is transmitted by the transducer 20 includes the area into which water normally flows from the outlet 24 of the faucet 10.

Figure 2:
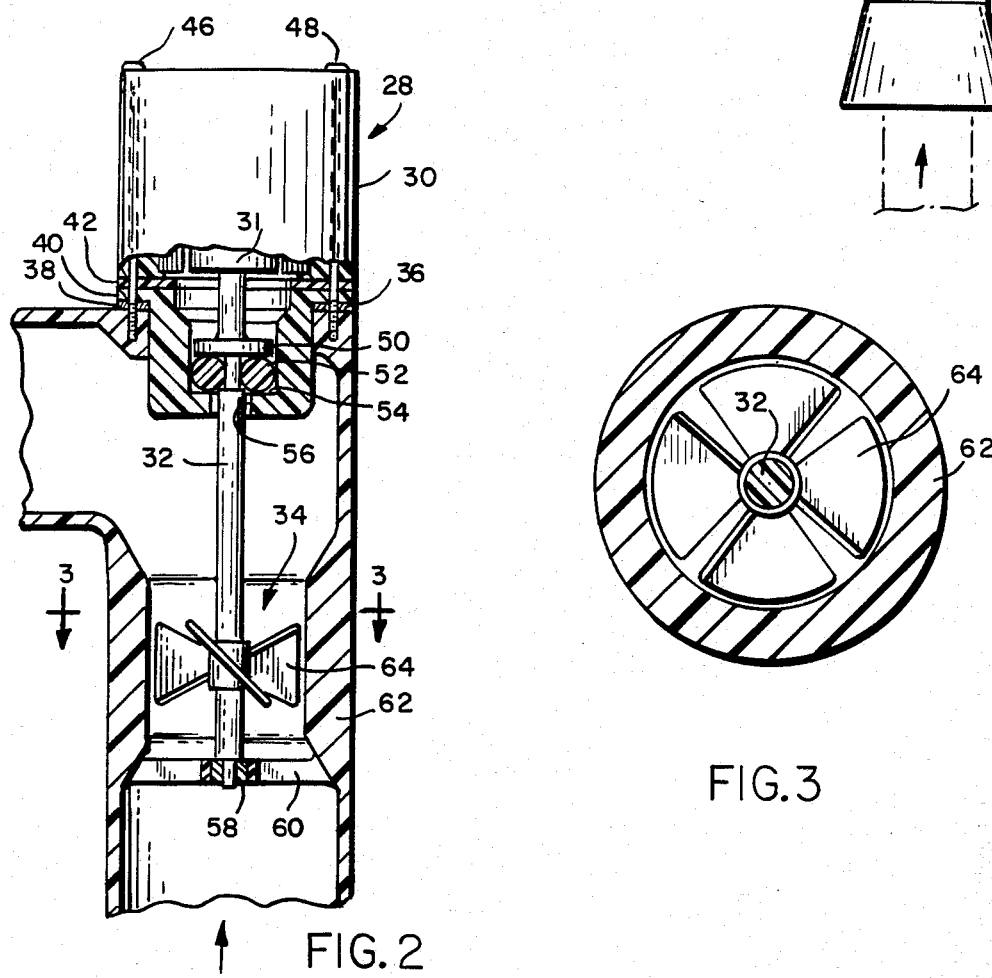
FIG. 2 is a largely sectional view of the turbine-generator portion of the embodiment of FIG. 1.

A push button 26 is mounted on the front of the faucet and electrically connected by concealed wires to the control circuit 16 so that the user can bring the faucet into operation or turn it off by depressing the push button 26. The assembly 10 also includes a generator 28 that is driven, as will be described in more detail in connection with FIGS. 2 and 3, to recharge the battery pack 18.

The assembly 10 is typically employed in a washbasin having separate manual valves, not shown in the drawings, for controlling the proportions of hot and cold water. When the user initially depresses the push button 26 to begin operation, water flows for a predetermined duration that is long enough to allow him to operate the valves and thereby achieve the proper temperature. The valve then closes automatically until the ultrasonic transducer 20, which is both a transmitting and receiving transducer, detects a moving object in its sensing region 22 within a predetermined distance from the faucet. When such an object is detected, the control circuit 16 opens the valve and permits water to flow until motion within the region stops. When motion is no longer detected, the control circuit 16 stops flow after a short delay. Thus, if the user is washing dishes and moves a plate into the region 22, water will flow to rinse the plate so long as the plate is in the target region 22 and keeps moving. Flow will stop a short time after the plate is moved out of the region.

When the user is finished, he depresses the push button 26, thereby removing power from the circuitry 16 and preventing the valve from opening in response to the presence of objects within the sensing region 22. Furthermore, if the circuitry 16 does not detect any motion within the sensing region 22 for a predetermined amount of time, say, five minutes, it turns itself off automatically, and the subsequent presence of an object within the sensing region 22 will no longer cause water flow unless the push button 26 is again operated. This prevents the circuit from wasting power when the device is left on inadvertently, and it eliminates the danger of unwanted water flow in an unattended faucet.

As was mentioned above, a generator assembly 28 is provided so that the flow of water itself recharges the battery pack 18 and thus eliminates the need to run external wires to the faucet. Furthermore, the faucet is preferably so constructed that the conventional faucet can be unscrewed and removed and the faucet 10 of the present invention installed without connecting any wires.

A generator housing 30 (FIG. 2) encloses a generator 31 driven by a shaft 32 on which is mounted a turbine 34 disposed in the water flow path. An annular shoulder 36 is formed on the upper surface of the faucet, and a gasket 38 is compressed between a cup-shaped shaft bearing 40 and the shoulder 36. A second gasket 42 seals between the annular upper surface of the bearing 40 and the lower surface of the generator housing 30. Bolts 46 and 48 extend from the upper end of the generator housing 30 through holes in the gaskets 38 and 42 and bearing 40 to threadedly engage the annular shoulder 36, thereby holding the bearing 30 tightly in place and compressing the gaskets 38 and 42.

A disk-shaped enlargement 50 of the generator shaft 32 compresses an O-ring 52 between itself and the lower inner surface 54 of the bearing 40 to seal between the generator shaft 32 and the opening 56 by which the shaft 32 extends through the lower end of the bearing 40. At its other end, the generator shaft 32 is held in place by a bushing 58 supported by a spider 60 formed as part of the vertical portion of the faucet.

Figure 3:
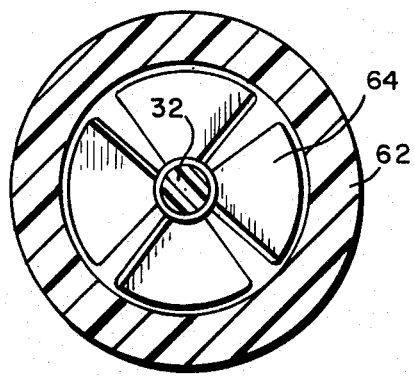
FIG. 3 is a cross-sectional view taken at line 3—3 of FIG. 2.

The turbine 34 is disposed in a narrowed region defined by a thickened portion 62 of the faucet. The turbine 34 includes four blades 64. Water flow causes these blades to rotate in the counterclockwise direction, as seen in FIG. 3, to generate electrical power that is applied to the battery pack 18 by a charging circuit to recharge the batteries.

Figure 4:
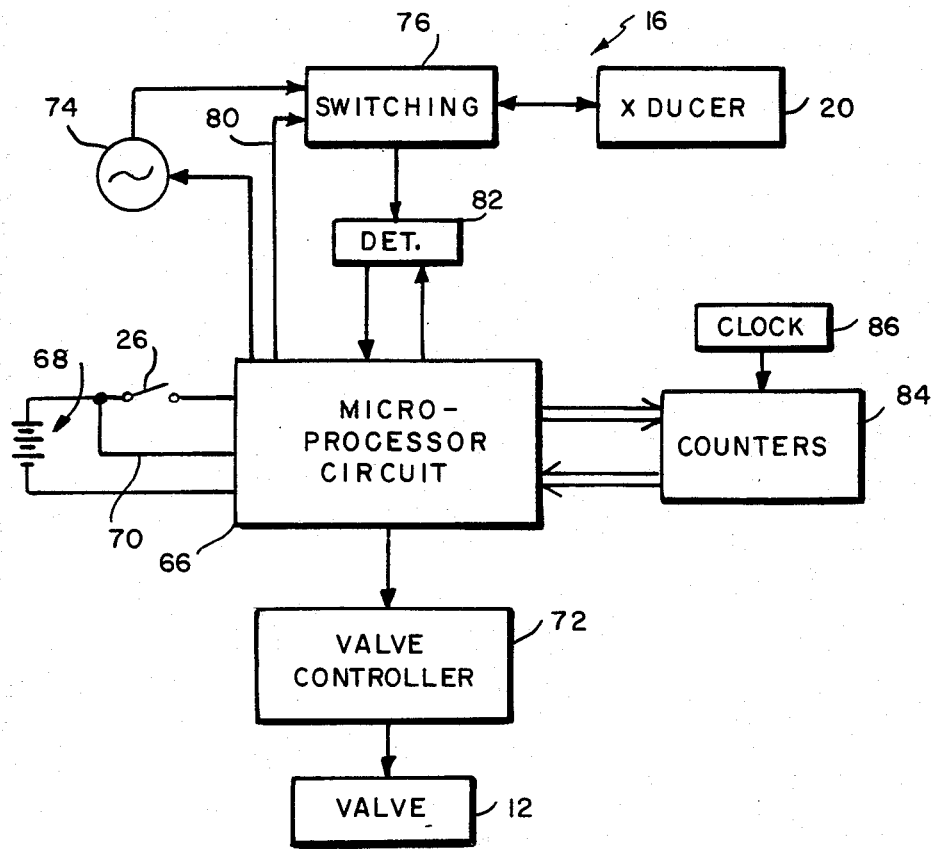
FIG. 4 is a block diagram of the control circuitry of the embodiment of FIG. 1.

A conceptual block diagram of the control circuit 16 is presented in FIG. 4, in which the heart of the circuit is depicted as a microprocessor circuit 66. In addition to a basic microprocessor, element 66 includes memory and input/output devices of the type usually used with the microprocessor chosen. The batteries 68 in the battery pack 18 (FIG. 1) are connected to the microprocessor 66 through the momentary switch 26, which is also shown in FIG. 1.

A bypass line 70 bypasses the momentary switch 26 and leads to a latch (not shown) internal to circuit 66 that can be operated by the microprocessor. This latch is initially open so that power from batteries 68 is not applied to the remaining circuitry by way of bypass line 70. Consequently, the circuitry is not a drain on the batteries 68. When the momentary switch 26 is operated, the internal latch operates to keep power applied to the circuitry even after the momentary switch 26 opens again. A subsequent operation of the momentary switch 26 while the internal latch is closed is interpreted as a command to open the latch, and power is removed from the circuit. Otherwise, the latch remains closed, and power continues to be applied to the circuitry, so long as the valve 12 is operated with some frequency. If the valve 12 remains closed for five minutes, though, the latch opens again, removing power from the circuitry so that it is not powered until the pushbutton 26 is again operated.

The microprocessor circuit 66 controls a valve controller 72 that drives the valve actuator and thus changes the state of the valve 12 in response to commands from the microprocessor 66.

The microprocessor 66 controls operation of the ultrasonic transducer 20 by operating an oscillator/amplifier 74, which is connected to the transducer 20 through a switching network 76. The lines by which the transducer is driven are the same as those by which it returns received pulses, and switching circuitry 76 is controlled by the microprocessor circuit 66, as line 80 suggests, to switch among the several states. In one state, the switching circuitry 76 connects the oscillator/amplifier to the ultrasonic transducer 20 to drive it and thus transmit ultrasound. In the next state, the switching circuitry 76 disconnects the oscillator/amplifier 74 from the transducer 20 and generally isolates the transducer 20 from the rest of the circuit. During this time, the circuitry neither transmits nor "listens" for echoes from objects in the transducer's sensing region 22. This avoids reception of spurious echoes and ringing signals that are likely to occur immediately after driving of the transducer 20 stops.

In the third state, the switching network 76 connects the transducer 20 to a detection circuit 82 that transmits a signal to the microprocessor 66 when the transducer 20 produces echo signals above predetermined threshold levels. As those skilled in the art will recognize, such circuits typically include time-dependent gain controls to compensate for the high rate of ultrasound attenuation in air.

When the microprocessor initially causes the transducer 20 to transmit an ultrasound pulse, it resets one of the counters in a counter circuit 84 and enables it so that it begins counting in response to pulses from a free-running clock 86. When the first echo is received, the microprocessor disables the counter so that it stops counting and retains the current count, which is proportional to the distance of the transducer 20 from the object that caused the echo.

Figure 5:
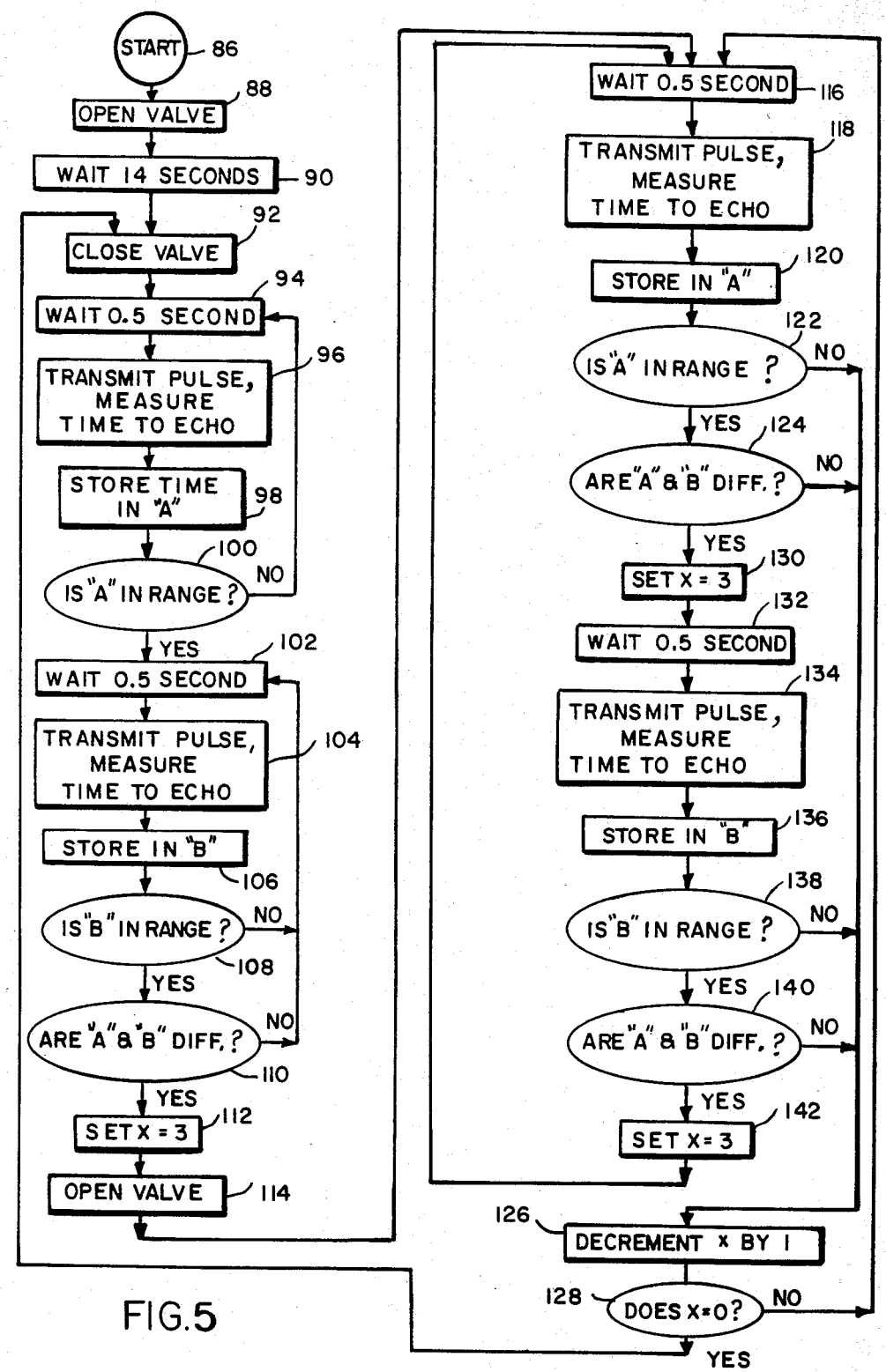
FIG. 5 is a flow chart describing the criteria by which the circuitry of FIG. 4 determines whether the flow-control valve should be open or closed.

FIG. 5 is a conceptual flow diagram illustrating the criteria by which the control circuit determines when to open and close the valve.

The "start" circle 86 represents the point at which the circuit is turned on by operation of the momentary switch 26. In response, the circuitry performs initialization routines and opens the valve 12, as block 88 indicates. Block 90 represents a fourteen-second wait during which the water flows so that the user can adjust the temperature. The valve is then closed, as block 92 indicates, and the circuit goes into the closed-valve routine represented by the rest of the first column of FIG. 5. There is a half-second delay, represented by block 94, between each pulse transmission. When a pulse is transmitted, the circuitry measures the time between the transmission and any resultant echo, as was explained above. This function is represented by block 96.

The resultant measurement is stored in register A, as block 98 indicates, and the circuitry then determines whether the contents of register A are within a range that represents the farthest distance at which the device is designed to respond to the presence of an object. Typically, this distance will be somewhat less than the distance to the bottom of the sink but greater than the distance at which a dish to be rinsed will ordinarily be held.

If the distance is not within the predetermined range, the routine returns to the half-second wait represented by block 94 and repeats the loop. If the distance is within the range, the routine executes a half-second wait and then transmits another pulse, as blocks 102 and 104 indicate. Block 106 represents the step of storing the result in a second register, register B, and decision block 108 represents testing the contents of register B to determine whether the most recent measured distance is within the predetermined range. If not, the routine returns to the point represented by block 102. Otherwise, the contents of registers A and B are compared, as decision block 110 indicates. The contents of registers A and B typically represent the measurements from the two most recent ultrasound pulses. If the decision block 110 has been reached, the contents of registers A and B are both within range, and, if they are equal, then the object has not moved during the intervening half second by more than a distance that is less than the system resolution. Of course, it may be desired to permit more movement than this, and the test would then be whether the difference between the contents of registers A and B is less than a predetermined number. However, it may be more convenient to tailor the system resolution to the predetermined threshold for movement.

Occasionally, the test represented by block 110 does not represent the two most recent measurements. For instance, when the result of the test represented by block 110 is negative, the routine repeats the loop represented by blocks 102–110, and it continues in this loop until the contents of register B are in range and different from the contents of register A. Although the two most recent measurements are not compared, the test is acceptable because a positive result of the test represented by block 110 still is an indication that an object is within the target range and movement has occurred.

If the test represented by block 110 has a positive result, an index X is set to a value of three, as block 112 indicates, and the valve is opened. The index X is used in providing the delay between a failure to detect motion and the closing of the valve 12.

The routine then proceeds to the open-valve portion depicted in the second column of FIG. 5, as blocks 114 and 116 indicate. Another measurement is then made and the result stored in register A, as blocks 118 and 120 indicate. Block 122 represents testing the resultant value to determine whether or not it is in range. The contents of register A are also tested to determine whether they differ from the contents currently stored in register B, as block 124 indicates. If the result of either of these tests is negative, the routine proceeds to the steps represented by block 126, in which the index X is decremented by one, and block 128, in which X is tested to determine whether or not its value is zero. If its value is zero, then the intended delay is complete, and the valve is closed, as block 92 indicates. The program then returns to its closed-valve portion. If the test represented by block 128 reveals that X is not yet equal to zero, the routine returns to the step represented by block 116.

If the results of both of the tests represented by blocks 122 and 124 are positive, then the index X is set equal to three again, as block 130 indicates, and the system waits a half second, makes another measurement, and stores the result in register B, as blocks 132–136 indicate. The contents of register B are tested to determine if they are in range and are then compared with the contents of register A, as blocks 138 and 140 indicate. If the result of either of these tests is negative, the index X is decremented by one, as block 126 indicates, and X is again tested to determine whether or not it is equal to zero, as block 128 indicates.

Thus, after three successive negative tests to detect in-range moving objects, the index X will have been decremented to zero, and the valve will be closed. If the system fails to detect movement for only a second, the valve will remain open if movement within the range is detected soon thereafter. This time delay associated with the index X eliminates the excessive operation of the valve 12 that might otherwise occur in response to intermittent movements of dishes in the sensing region 22.

If the results of both of the tests represented by blocks 138 and 140 are positive, the index X is set equal to three, as block 142 indicates, and the open-valve portion of the routine begins again.

The flow chart of FIG. 5 does not depict a determination of whether the valve has been inactive for too long a time. However, such a routine runs concurrently with the routine of FIG. 5, which is interrupted to cause the system to shut down if the valve remains closed for more than five minutes. The routine employs a second counter in counter circuit 84. This counter is reset whenever the valve 12 closes and begins counting when the valve opens. If the five-minute period mentioned above elapses without a valve opening, this counter reaches a predetermined count that causes the microprocessor to release the internal latch that keeps power applied to the circuit 16. This action turns off the circuit and prevents any further actuation of the valve 12 until the momentary switch 26 is operated again.

The preferred embodiment of the invention described above employs both distance and movement criteria to determine whether or not to open the valve. With a movement criterion, a stationary object, such as a wash basin, does not cause the faucet to turn on. Of course, a fork that the user wants to rinse is also a stationary object if the user is not moving it. However, there will normally be enough movement of the object to be rinsed so that the unit will be activated. Additionally, a user will quickly become accustomed to the fact that some movement is required in order to activate the device, and this movement readily becomes a habit that causes no inconvenience. On the other hand, it would be quite inconvenient if the device were to be activated by the mere presence of, say, a stationary wash basin or dishes stacked high enough to be within the distance range of the system.

With the motion-detection requirement, there is no absolute necessity for the additional requirement, set out above, that the echo be caused by an object within a predetermined distance from the faucet. However, I believe that this range requirement further eliminates possible spurious responses without any significant reduction in the usefulness of the device.

It should be noted that the preferred embodiment of my device does not employ the frequency-change determination used by Doppler-type devices; instead, it subtracts different measured times. This is an advantage because a Doppler-type device might be activated erroneously by running water. Futhermore, vibrations of, for instance, the sink bottom could cause erroneous operation in sensitive Doppler-type devices because high-frequency vibrations might cause considerable Doppler-effect frequency change despite the undetectably small magnitude of the vibrations. On the other hand, although the movements of dishes are comparatively large in distance, their velocities are not typically great enough for detection by any but the most sensitive Doppler-effect devices, and the most sensitive devices are the ones most subject to erroneous operation. Thus, detecting motion by measuring distance changes rather than by employing the Doppler effect provides considerable advantages.

Many of the advantages of the present invention can be obtained in embodiments that differ somewhat from the preferred embodiment illustrated in the drawings. For instance, although I believe that the provision of a self-contained power source provides significant advantages for home use, it might be found that an external power source is acceptable in public restrooms, hospital scrub rooms, and industrial locations generally. Furthermore, although I prefer decision criteria based on both motion and range, it is clear that many of the advantages of the invention are afforded even if only the motion requirement is employed. On the other hand, although I greatly prefer the motion criterion, simple proximity can be used as a criterion in some specific-purpose installations in which the presence of an object in the target region is unlikely to occur when water flow is not desired.

Thus, the benefits of the present invention can be obtained in a wide variety of embodiments.

I claim:

1. An ultrasonic flow-control system comprising
  A. a faucet, having an inlet and an outlet and providing a fluid path between the inlet and the outlet, for receiving liquid at its inlet and directing the liquid out through its outlet;
  B. an electrically operable valve interposed in the fluid path and operable, by application of control signals thereto, between an open position, in which it permits fluid flow in the fluid path, and a closed position, in which it prevents fluid flow therein;
  C. ultrasound means operable by application of drive signals thereto to transmit ultrasound into a target region that includes the path of liquid leaving the outlet, the ultrasound means detecting ultrasound reflected from objects in the target region and generating electrical echo signals in response; and
  D. a control circuit electrically connected for application of control signals to the electrically operable valve and drive signals to the untrasound means and for reception of echo signals from the ultrasound means, the control circuit operating the ultrasound means to transmit ultrasound into the target region and including means for measuring the time between ultrasound transmission and the reception of echo signals and means for, in at least one mode of operation, operating the valve to permit liquid flow if successive measurements of the time between ultrasound transmission and the reception of echo signals differ but prevent liquid flow if successive measurements remain the same, whereby liquid flows from the faucet if a moving object is present in the target region but not if no moving object is in the target region.

2. An ultrasonic flow-control system as recited in claim 1 wherein the valve-operating means operates the valve to permit liquid flow only if the time between ultrasound transmission and the reception of an echo signal is less than a predetermined maximum.

3. An ultrasonic flow-control system as recited in claim 1 wherein the ultrasound means includes a single ultrasonic transducer connected to the control circuit for both transmission of ultrasound and reception of ultrasound echoes.

4. An ultrasonic flow-control system as recited in claim 1 wherein the ultrasound means transmits and detects ultrasound near the faucet outlet so that the measurement of the time between ultrasound transmission and the reception of echo signals is an indication of the distance of an echo-causing object from the outlet.

5. A flow-control system comprising:
  A. a faucet, having an inlet and an outlet and providing a fluid path between the inlet and the outlet, for receiving liquid at its inlet and directing the liquid out through its outlet;
  B. an electrically operable valve interposed in the fluid path and operable, by application of control signals thereto, between an open position, in which it permits fluid flow in the fluid path, and a closed position, in which it prevents fluid flow therein; and
  C. a detection circuit electrically connected for application of control signals to the electrically operated valve, the detection circuit including means for detecting moving objects and means for, in at least one mode of operation, operating the valve to permit liquid flow if the detecting means detects a moving object and for operating the valve to prevent fluid flow if the detecting means does not detect a moving object.

6. A flow-control system as recited in claim 5 wherein the detecting means comprises a measuring circuit for repeatedly measuring the distance of an object from a reference point, the valve-operating means, in at least one mode of operation, applying control signals to the valve to permit liquid flow if successive distance measurements differ.

7. A flow-control system comprising:
  A. a conduit, defining a fluid path, for directing liquid along the fluid path;

B. an electrically operable valve interposed in the fluid path and operable, by application of control signals thereto, between an open position, in which it permits fluid flow in the fluid path, and a closed position, in which it prevents fluid flow therein;
C. an operational circuit electrically connected for application of control signals to the valve to control the position of the valve;
D. a turbine mounted in the fluid path for driving by fluid flowing in the fluid path; and
E. an electrical generator mechanically connected to the turbine to be driven thereby and electrically connected to the operational circuit to power it when the generator is driven by the turbine.

8. A flow-control system as recited in claim 7 wherein:
A. the flow-control system further comprises a faucet, including the conduit and having an inlet and an outlet, for receiving liquid at its inlet and directing the liquid out through its outlet; and
B. the operational circuit comprises a detection circuit for detecting the presence of an object in a target region that includes the path of liquid leaving the outlet and for controlling the position of the valve in accordance with the object detection.

9. A flow-control system as recited in claim 8 wherein the detection circuit detects motion of an object in the target region and, in at least one mode of operation, controls the position of the valve in accordance with the object motion.

10. A flow-control system as recited in claim 9 wherein the detection circuit comprises a measuring circuit that repeatedly measures the distance of an object from the reference point and, in at least one mode of operation, applies control signals to the valve to permit liquid flow if successive distance measurements differ.

11. A flow-control system as recited in claim 10 wherein the measuring circuit comprises:
A. ultrasound means operable by application of drive signals thereto to transmit ultrasound into the target region, detect ultrasound reflected from objects in the target region, and generate electrical signals in response; and
B. a control circuit electrically connected for application of control signals to the electrically operable valve and drive signals to the ultrasound means, the control circuit operating the ultrasound means to transmit ultrasound into the target region and, in at least one mode of operation, operating the valve to permit liquid flow if successive measurements of time between ultrasound transmission and the reception of ultrasound echo signals differ.

12. A flow-control system as recited in claim 7 wherein the operational circuit comprises a measuring circuit for measuring the distance of an object from a reference point and, in at least one mode of operation, applying control signals to the valve in accordance with the distance measured.

13. A flow-control as recited in claim 12 wherein the measuring circuit comprises:
A. ultrasound means operable by application of electrical signals thereto to transmit ultrasound into a target region that includes the path of liquid leaving the outlet, the ultrasound means detecting ultrasound reflected from objects in the target region and generating electrical signals in response; and
B. a control circuit electrically connected for application of control signals to the electrically operable valve and drive signals to the ultrasound means, the control circuit operating the ultrasound means to transmit ultrasound into the target region and operating the valve in accordance with the echo signals that it receives.

* * * * *